United States Patent
Nakamura et al.

(10) Patent No.: US 8,160,368 B2
(45) Date of Patent: Apr. 17, 2012

(54) IMAGE FEATURE EXTRACTION METHOD AND IMAGE COMPRESSION METHOD

(75) Inventors: Yoshimasa Nakamura, Osaka (JP); Masashi Iwasaki, Osaka (JP); Masahiko Obata, Tokyo (JP); Koichi Kondo, Kyoto (JP); Shohei Sasada, Gifu (JP)

(73) Assignees: Japan Science and Technology Agency, Saitama (JP); The Doshisha, Kyoto (JP)

( * ) Notice: Subject to any disclaimer, the term of this patent is extended or adjusted under 35 U.S.C. 154(b) by 565 days.

(21) Appl. No.: 12/376,059

(22) PCT Filed: Feb. 2, 2007

(86) PCT No.: PCT/JP2007/051831
§ 371 (c)(1),
(2), (4) Date: May 27, 2009

(87) PCT Pub. No.: WO2008/015799
PCT Pub. Date: Feb. 7, 2008

(65) Prior Publication Data
US 2009/0324064 A1    Dec. 31, 2009

(30) Foreign Application Priority Data
Aug. 2, 2006  (JP) ................................. 2006-211219

(51) Int. Cl.
G06K 9/56  (2006.01)
G06K 9/46  (2006.01)
G06K 9/36  (2006.01)

(52) U.S. Cl. .......................... 382/205; 382/190; 382/232
(58) Field of Classification Search .................. None
See application file for complete search history.

(56) References Cited

U.S. PATENT DOCUMENTS

| 5,615,288 A | 3/1997 | Koshi et al. |
| 6,333,501 B1 * | 12/2001 | Labrenz ................. 250/341.5 |
| 2002/0150281 A1 * | 10/2002 | Cho ........................ 382/117 |

FOREIGN PATENT DOCUMENTS
JP    06-311370    11/1994

OTHER PUBLICATIONS

Achlioptas, Fast Computation of Low Rank Matrix Approximations, Jul. 8, 2001, STOC'01, pp. 611-618.*
Kakarala, Signal Analysis Using a Multiresolution Form of the Singular Value Decomposition, 2001, IEEE Transactions on Image Processing, vol. 10, No. 5, pp. 724-735.*
Bingham, Random projection in dimensionality reduction: Applications to image and text data, 2001, Laboratory of Computer and Information Science Helsinki University of Technology (6 pages).*
IPSJ SIG Technical Reports, vol. 2006, No. 20, Feb. 27, 2006 to Mar. 1, 2006, ISSN 0919-6072 (11 pages)—Abstract in English on p. 169.
International Search Report from PCT/JP07/051831 dated May 15, 2007.

* cited by examiner

*Primary Examiner* — Jason M Repko
*Assistant Examiner* — David F Dunphy
(74) *Attorney, Agent, or Firm* — Snell & Wilmer L.L.P.

(57) ABSTRACT

The image feature extraction method of the present invention includes: the step of performing $k^2$ dividing process at least once on a given image so as to convert the given image into a multi-divided image, where the $k^2$ dividing process comprises the steps of: a) creating matrix T based on image matrix X; b) computing singular values of the matrix T; c) determining whether or not $\min_j |\sigma_j - \sigma_{j-1}| > \epsilon$; d) if the result of the determination in the step c) is "No", returning to the step c) subsequent to computing the singular values of the enlarged matrix $T_\alpha$; e) if the result of the determination in the step c) is "Yes", obtaining U which satisfies $T=USV^T$; f) obtaining matrix $T_1=U^T T$; and g) creating image matrix $X_1$ based on matrix $T_1$.

20 Claims, 10 Drawing Sheets

(a) Original Image (b) Images divided into quadrants (a) Vertical stripe  (b) Horizontal stripe  (c) Diagonal stripe I  (d) Diagonal stripe II  (e) Random

IMAGE FEATURE EXTRACTION METHOD AND IMAGE COMPRESSION METHOD

CROSS-REFERENCE TO RELATED APPLICATIONS

This application is U.S. national phase filing under 35 U.S.C. §371 of PCT/JP2007/051831 filed Feb. 2, 2007 and claims priority from Japanese Application No. 2006-211219 which was filed on Aug. 2, 2006.

TECHNICAL FIELD

The present invention relates to: an image compression method capable of always realizing, at the same compression rate, a finer compression than that performed by JPEG; and an image feature extraction method appropriate for the image compression method.

BACKGROUND ART

As the advancement of hardware, image level of images handled by peripheral devices, such as a computer and a digital camera/printer, now matches that handled by an ultra-precise analog camera. Naturally, the data amount contained in an image increases. Therefore, when display speed is considered more important than precise image detail, an image compression is a requisite technique. Ideally, this image compression not only reduces the data amount, but compresses an original image to have the difference therefrom unrecognizable by person's eyesight when it is decompressed. At the same time, if a size of a storage area can be smaller, it is possible to effectively use computer resources, such as a memory and a hard disk.

At Web sites, images compressed in a format of such as GIF, JPEG and PNG are generally used. These compressed images are appropriate for Web sites which require a high accessibility since a file size thereof is significantly suppressed when compared to that of an uncompressed image, such as a BMP image. In addition, an image compression technique is often highly appreciated when image data is transmitted and received via a network.

Light and dark shading of color of an image is digitalized inside a computer for each pixel. For example, 256 tone gray scale image X having m number of vertical pixels and n number of horizontal pixels is represented as m×n matrix having integer values of [0, 255] as its components.

$$X = \begin{pmatrix} x_{11} & x_{12} & \ldots & x_{1,n} \\ x_{21} & x_{22} & \ldots & x_{2,n} \\ \vdots & \vdots & \ddots & \vdots \\ x_{m,1} & x_{m,2} & \ldots & x_{m,n} \end{pmatrix},$$ [Expression 1]

where $x_{i,j}$ are integer values of [0, 255].

Hereinafter, an image and a matrix are represented as identical. An RGB color image holds light and dark shading information regarding three colors of Red, Green and Blue, respectively, in a similar matrix form to that of a gray scale image. Accordingly, for simplicity, the gray scale image will be described hereinafter.

A two-dimensional discrete Wavelet transformation or a blocking+singular value decomposition is performed once on image X. Image $X_1$, which is like a one-half size of image X, is generated at an upper-left corner of $(m/2) \times (m/2)$ pixels. Edge extracted images in a vertical direction, a horizontal direction and a diagonal direction appear at upper-right corner, a lower-left corner and at a lower-right corner, respectively. Similarly, $X_1$ is divided into quadrants, (i.e., $X_1 \rightarrow$ (reduced approximated image $X_2$)+(edge extracted image in vertical direction)+(edge extracted image in horizontal direction)+(edge extracted image in diagonal direction), and then $X_2$ is further divided into quadrants . . . , and up to $X_K$ is divided into quadrants. Repeating the division like this generates multi-divided images. This is a fundamental step of an image compression [1]. After the multi-division of the image, this image is coded by using SPIHT [5] and the like. Even a discrete cosine transformation requires the placing image X into blocks. However, in the case thereof, a division for an image into quadrants, as performed in the case of the block singular value decomposition, is not performed in the discrete cosine transformation. Quantization and coding by using the Huffman code are performed on the discrete cosine transformation, and a compressed image having a small amount of data and easy to enlarge and reduce a size of the compressed data is obtained. However, it should be noted that an original image of this compressed data cannot be restored and thus the discrete cosine transformation is an irreversible transformation [2].

An algorithm for multi-division by the block singular value decomposition is proposed by Kakarala-Ogunbona [3]. A hybrid-type algorithm using both this algorithm and the discrete wavelet transformation is also reported [1]. It is known that an image having special property such as a fingerprint is image-compressed by the hybrid-type algorithm so as to have more natural image quality than the discrete cosine transformation or the discrete wavelet transformation, which were put into practice as JEPG and JPEG 2000. An image compression performed by the block singular value decomposition includes various potentials, thus requiring a further numerical verification.

Non-patent Document Reference 1: [1] Ashino, R., Morimoto, A., Nagase, M., and Vaillancourt, R.: Image compression with multi-division singular value decomposition and other methods, Math. Comput. Model., Vol. 41, pp. 773. 790 (2005)

Non-patent Document Reference 2: [2] KOSHI Tomohiro, KURODA Hideo: JPEG & MPEG "Image compression technique understand able with illustration", Nippon Jitsugyo Publishing (2006)

Non-patent Document Reference 3: [3] Kakarala, R., and Ogunbona, O. P.: Signal analysis using a multi-division form of the singular value decomposition, IEEE Trans. Image Process., Vol. 10, pp. 724. 735 (2001)

Non-patent Document Reference 4: [4] Iwasaki, M., and Nakamura, Y.: Accurate computation of singular values in terms of shifted integrable schemes, (submitted)

Non-patent Document Reference 5: [5] Said, A., and Pearlman, A. W.: A new fast and efficient image codec based on set partitioning in hierarchical trees, IEEE Trans. on Circuits and Systems for Video Technology, Vol. 6, pp. 243. 250 (1996)

Non-patent Document Reference 6: [6] TAKATA Masami, KIMURA Yasushi, IWASAKI Masashi, and NAKAMURA Yoshimasa: Library development for high speed singular value decomposition (submitted)

Non-patent Document Reference 7: [7] Parlett, B. N., and Marques, O. A.: An implementation of the dqds algorithm (positive case), Lin. Alg. Appl., Vol. 309, pp 217.259 (2000)

DISCLOSURE OF THE INVENTION

The present specification first examines a distribution of singular values of a matrix targeted for a singular value decomposition when a multi-division is performed by the Kakarala-Ogunbona algorithm. Depending on an image, singular values are overlapping and adjacent to each other. In such a case, however, an existing singular value decomposition method cannot always compute singular vectors at high precision [6]. [6] shows a result experimented with a double precision arithmetic; however, it is further difficult to compute the singular vectors at high precision by a single precision arithmetic or an integer-type arithmetic.

The present invention newly formulates an algorithm for reducing proximity of singular values in the block singular value decomposition. One objective of the present invention is to provide an image compression method capable of always realizing, at the same compression rate, a finer compression than that performed by JPEG; and an image feature extraction method appropriate for the image compression method.

The method according to the present invention is an image feature extraction method for extracting a feature of an image, including the step of performing $k^2$ (k is an arbitrary integer greater than or equal to 2) dividing process at least once on a given image so as to convert the given image into a multi-divided image, where the $k^2$ dividing process comprises the steps of: a) creating matrix T based on image matrix X; b) computing singular values $\sigma_1, \sigma_2, \ldots, \sigma_{k^2}$ of the matrix T, where $\sigma_1 \geq \sigma_2 \geq \ldots \geq \sigma_{k^2}$; c) determining whether or not $\min_j |\sigma_j - \sigma_{j-1}| > \epsilon$, where $\epsilon$ shows a constant greater than or equal to machine epsilon; d) if the result of the determination in the step c) is "No", returning to the step c) subsequent to computing the singular values of the enlarged matrix $T_\alpha$; e) if the result of the determination in the step c) is "Yes", obtaining U which satisfies T $USV^T$, where S=diag $(\sigma_1, \sigma_2, \ldots, \sigma_{k^2})$, U is an orthogonal matrix and V is an orthogonal matrix; f) obtaining matrix $T_1 = U^T T$; and g) creating image matrix $X_1$ based on matrix $T_1$, where the computing the singular values of the enlarged matrix $T_\alpha$ in the step d) comprises the steps of: creating enlarged matrix $T_\alpha$ based on matrix T and a frame added to at least a portion of at least one side of image matrix X, the frame having a size of at least k pixels and k pixels; and computing singular values $\sigma_1, \sigma_2, \ldots, \sigma_{k^2}$ of the enlarged matrix $T_\alpha$, where $\sigma_1 \geq \sigma_2 \geq \ldots \geq \sigma_{k^2}$, thereby achieving the objective described above.

The method according to the present invention is an image feature extraction method for extracting a feature of an image, comprising the step of performing $k^2$ (k is an arbitrary integer greater than or equal to 2) dividing process at least once on a given image so as to convert the given image into a multi-divided image, where the $k^2$ dividing process comprises the steps of: a) creating matrix T based on image matrix X; b) obtaining a singular value decomposition of the matrix T, $T=USV^T$, where S=diag $(\sigma_1, \sigma_2, \ldots, \sigma_{k^2})$, $\sigma_1, \sigma_2, \ldots, \sigma_{k^2}$ are singular values of T satisfying $\sigma_1 \geq \sigma_2 \geq \ldots \geq \sigma_{k^2}$, U is an orthogonal matrix and V is an orthogonal matrix; c) determining whether or not $\min_j |\sigma_j - \sigma_{j-1}| > \epsilon$, where $\epsilon$ shows a constant greater than or equal to machine epsilon; d) if the result of the determination in the step c) is "No", returning to the step c) subsequent to performing singular value decomposition of enlarged matrix $T_\alpha$; e) if the result of the determination in the step c) is "Yes", obtaining matrix $T_1 = U^T T$; and f) obtaining matrix $T_1 = U^T T$ based on matrix $T_1$, where the performing singular value decomposition of enlarged matrix $T_\alpha$ comprises the steps of: creating enlarged matrix $T_\alpha$ based on matrix T and a frame added to at least a portion of at least one side of image matrix X, the frame having a size of at least k pixels and k pixels; and obtaining the singular value decomposition of the enlarged matrix $T_\alpha$, $T_\alpha = USV^T$, where S=diag $(\sigma_1, \sigma_2, \ldots, \sigma_{k^2})$, $\sigma_1, \sigma_2, \ldots, \sigma_{k^2}$ is a singular value of $T_\alpha$ which satisfies $\sigma_1 \geq \sigma_2 \geq \ldots \geq \sigma_{k^2}$, U is an orthogonal matrix, and V is an orthogonal matrix, thereby achieving the objective described above.

The image may be a gray scale image or a color image.

The singular value decompositions of the T and the $T_\alpha$ may be performed by floating point arithmetic.

The singular value decompositions of the T and the $T_\alpha$ may be performed by integer arithmetic.

A known $k^2$ dividing process such as wavelet transformation may be used together with the $k^2$ dividing process, so that the given image matrix X is converted into a multi-divided image.

The method according to the present invention is an image compression method for compressing an image, including the steps of: performing $k^2$ (k is an arbitrary integer greater than or equal to 2) dividing process at least once on a given image so as to convert the given image into a multi-divided image; and performing a data compression process on the multi-divided images so as to create a compressed image, where the $k^2$ dividing process comprises the steps of: a) creating matrix T based on image matrix X; b) computing singular values $\sigma_1, \sigma_2, \ldots, \sigma_{k^2}$ of the matrix T, where $\sigma_1 \geq \sigma_2 \geq \ldots \geq \sigma_{k^2}$; c) determining whether or not $\min_j |\sigma_j - \sigma_{j-1}| > \epsilon$, where $\epsilon$ shows a constant greater than or equal to machine epsilon; d) if the result of the determination in the step c) is "No", returning to the step c) subsequent to computing the singular values of the enlarged matrix $T_\alpha$; e) if the result of the determination in the step c) is "Yes", obtaining U which satisfies $T=USV^T$, where S=diag $(\sigma_1, \sigma_2, \ldots, \sigma_{k^2})$, U is an orthogonal matrix and V is an orthogonal matrix; f) obtaining matrix $T_1 = U^T T$; and g) creating image matrix $X_1$ based on matrix $T_1$, where the computing the singular values of the enlarged matrix $T_\alpha$ in the step d) comprises the steps of: creating enlarged matrix $T_\alpha$ based on matrix T and a frame added to at least a portion of at least one side of image matrix X, the frame having a size of at least k pixels and k pixels; and computing singular values $\sigma_1, \sigma_2, \ldots, \sigma_{k^2}$ of the enlarged matrix $T_\alpha$, where $\sigma_1 \geq \sigma_2 \geq \ldots \geq \sigma_{k^2}$, thereby achieving the objective described above.

The method according to the present invention is an image compression method for compressing an image, comprising the steps of: performing $k^2$ (k is an arbitrary integer greater than or equal to 2) dividing process at least once on a given image so as to convert the given image into a multi-divided image; and performing a data compression process to the multi-divided images so as to create a compressed image, where the $k^2$ dividing process comprises the steps of: a) creating matrix T based on image matrix X; b) obtaining a singular value decomposition of the matrix T, $T=USV^T$, where S=diag $(\sigma_1, \sigma_2, \ldots, \sigma_{k^2})$, $\sigma_1, \sigma_2, \ldots, \sigma_{k^2}$ are singular values of T satisfying $\sigma_1 \geq \sigma_2 \geq \ldots \geq \sigma_{k^2}$, U is an orthogonal matrix and V is an orthogonal matrix; c) determining whether or not $\min_j |\sigma_j - \sigma_{j-1}| > \epsilon$, where $\epsilon$ shows constant greater than or equal to machine epsilon; d) if the result of the determination in the step c) is "No", returning to the step c) subsequent to performing singular value decomposition of enlarged matrix $T_\alpha$; e) if the result of the determination in the step c) is "Yes", obtaining matrix $T_1 = U^T T$; and f) obtaining matrix $T_1 = U^T T$ based on matrix $T_1$, where the performing singular value decomposition of enlarged matrix $T_\alpha$ comprises the steps of: creating enlarged matrix $T_\alpha$ based on matrix T and a frame added to at least a portion of at least one side of image matrix X, the frame having a size of at least k pixels and k pixels; and obtaining the singular value decomposition of the enlarged matrix $T_\alpha$, $T_\alpha = USV^T$, where S=diag $(\sigma_1, \sigma_2, \ldots, \sigma_{k^2})$, $\sigma_1, \sigma_2, \ldots, \sigma_{k^2}$ is a singular value of $T_\alpha$ which satisfies $\sigma_1 \geq \sigma_2 \geq \ldots \geq \sigma_{k^2}$, U is an orthogonal matrix, and V is an orthogonal matrix, thereby achieving the objective described above.

The image may be a gray scale image or a color image.

The singular value decompositions of the T and the $T_\alpha$ may be performed by floating point arithmetic.

The singular value decompositions of the T and the $T_\alpha$ may be performed by integer arithmetic.

A known $k^2$ dividing process such as wavelet transformation may be used together with the $k^2$ dividing process, so that the given image matrix X is converted into a multi-divided image.

The present invention can provide an image compression method capable of always realizing, at the same compression rate, a finer compression than that performed by JPEG; and an image feature extraction method appropriate for the image compression method.

BRIEF DESCRIPTION OF THE DRAWINGS

FIG. 1(*b*) is a diagram showing an example of an image divided into quadrants.

FIG. 2(*a*) shows a vertically striped pattern, FIG. 2(*b*) shows a horizontally striped pattern, FIG. 2(*c*) shows a diagonally striped pattern I, FIG. 2(*d*) shows a diagonally striped pattern II, and FIG. 2(*e*) shows a random pattern.

BEST MODE FOR CARRYING OUT THE INVENTION

Hereinafter, embodiments of the present invention will be described with reference to the accompanying drawings.

1. Introduction

Various methods have been proposed in order to compress a data amount of an image. Herein, an image compression algorithm of Kakarala-Ogunbona will be considered. With a combination of this method and a discrete wavelet transformation, it is possible to perform an excellent image compression. This method includes a computation process of a singular value decomposition for a multi-division of a matrix. However, a numerical verification therefor has not been sufficiently conducted yet. The present specification numerically shows a large fluctuation of a singular value distribution, depending on a type of an image and a formation of a cluster, by singular values in some cases. When the proximity of singular values is high, an existing singular value decomposition routine does not always obtain singular values at high precision, thereby causing a risk that a compressed image is significantly different from an original image. Accordingly, the present invention proposes an algorithm for dispersing clusters of singular values and enlarging a gap between the singular values and clarifies an effect thereof by a numerical experimentation.

Chapter 2 will overview a block singular value decomposition algorithm of Kakarala-Ogunbona for dividing an image into multi-divided images. Chapter 3 will describe a matrix with a singular value distribution when the Kakarala-Ogunbona algorithm is applied to images having a vertically striped pattern, a horizontally striped pattern, a diagonally striped pattern and a random pattern, respectively. Chapter 4 proposes a method for effectively enlarging a gap between singular values to reduce the proximity thereof in the block singular value decomposition algorithm and verifies its effect by a numerical experimentation.

2. Block Singular Value Decomposition Algorithm of Kakarala-Ogunbona

Figure 1:
FIG. 1(*a*) is a diagram showing an example of an original image.
Figure 1:

When a two dimensional wavelet transformation is performed on image matrix X, an image divided into quadrants shown in FIG. 1 is obtained. When this reduced approximated image is further repeatedly divided into quadrants, a multi-divided image is generated. Then, when this image is coded by using SPHIT, an image compression is completed. A multi-divided image is not limited to an image divided into quadrants. It is possible to generate a multi-divided image by repeatedly performing a $k^2$ division of a reduced approximated image (where k is an arbitrary integer greater than or equal to 2). Multi-division of an image can be realized by the blocking+singular value decomposition of X. The discrete cosine transformation can be used in combination of the blocking of X; however, in this case, an area divided into multi-divided images is not generated. The present chapter will overview the block singular value decomposition algorithm for performing a multi-division of an image proposed by Kakarala-Ogunbona. Kakarala-Ogunbona algorithm can be applied, with an arbitrary block size, to a rectangular-shaped image having an arbitrary image. In such a case, please refer to [1, 3]. In the case of an image having a large size, this image is first divided into a plurality of images having an appropriate size, and then each of the plurality of images can be divided into multi-divided images. For convenience, a description will be made regarding the Kakarala-Ogunbona algorithm when a block size is defined as 2, and an image to be divided into quadrants is created from original image X having 32 pixels and 32 pixels.

Kakarala-Ogunbona Algorithm (1) 32×32 matrix is divided into 2×2 minor matrices $X(k, l)$ $(1 \leq k \leq 16, 1 \leq l \leq 16)$.

$$X = \begin{pmatrix} X(1,1) & \cdots & X(1,16) \\ \vdots & \ddots & \vdots \\ X(16,1) & \cdots & X(16,16) \end{pmatrix},$$

$$X(k,l) \equiv \begin{pmatrix} x_{2k-1,2l-1} & x_{2k-1,2l} \\ x_{2k,2l-1} & x_{2k,2l} \end{pmatrix}.$$

[Expression 2]

(2) Each $X(k, l)$ is transformed into 4×1 column vector.

$$X(k,l) \mapsto x(k,l) \equiv \begin{pmatrix} x_{2k-1,2l-1} \\ x_{2k,2l-1} \\ x_{2k-1,2l} \\ x_{2k,2l} \end{pmatrix}.$$

[Expression 3]

(3) The column vectors are arranged so as to create 4×256 matrix T.

$$T = (T(1)T(2) \ldots T(16)),$$

$$T(l) \equiv (x(1,l)x(2,l) \ldots x(16,l))$$

[Expression 4]

(4) A singular value decomposition of T, $T=USV^T$, is obtained (where $S=\text{diag}(\sigma_1, \sigma_2, \sigma_3, \sigma_4)$, $\sigma_k$ (where k=1, 2, 3 and 4) is a singular value of T, U is 4×4 orthogonal matrix, and V is 256×256 orthogonal matrix).

(5) 4×256 matrix $T_1 = U^T T$ is obtained.

(6) The vector in k-th row (k-th row vector) of $T_1$ is transformed into 16×16 matrix $X_1(k)$.

$$X_1(k) = \begin{pmatrix} t_1(k,1) & \cdots & t_1(k,241) \\ \vdots & \ddots & \vdots \\ t_1(k,16) & \cdots & t_1(k,256) \end{pmatrix},$$

$t_1(k, j)$:$(k, j)$ component of $T_1$

[Expression 5]

(7) The matrices of $X_1(k)$ are arranged so as to form 32×32 matrix $X_1$.

$$X_1 = \begin{pmatrix} X_1(1) & X_1(2) \\ X_1(3) & X_1(4) \end{pmatrix}.$$

[Expression 6]

The vector in 1st column of orthogonal matrix U obtained in (4) is a filter for averaging four components of 2×2 matrix $X(k, l)$ blocked in (1). The component of $X(k, l)$ is arranged in the columns of T in (2) and (3), the average value of the four components included in the block is arranged in the first line of $T_1$, if $U^T$ is effected from the left side of T, as shown in (5). Therefore, if the first line of $T_1$ is transformed into $X_1(1)$, then this becomes a reduced approximated image of X. Similarly, $X_1(2)$, $X_1(3)$ and $X_1(4)$ correspond to images having edges thereof emphasized in the vertical direction, the horizontal direction and the diagonal direction of X, respectively. Thus, when the matrices of $X_1(k)$ are arranged, the division of X into quadrants is completed.

3. Type and Singular Value Distribution of Image

When an image to be divided into multi-divided images is created by using the Kakarala-Ogunbona algorithm, matrix T targeted for a singular value decomposition is different from each image, and singular values $\sigma_j$ ($\sigma_1 \geq \sigma_2 \geq \ldots$) to be obtained by a block singular value decomposition also varies.

In a singular value decomposition, a gap between singular values, $\text{gap} \equiv |\sigma_j - \sigma_{j+1}|$, is an important indicator with respect to a precision of singular vector. That is, as distribution of singular values densities, the orthogonality of singular vectors is generally aggravated [6].

Figure 2:
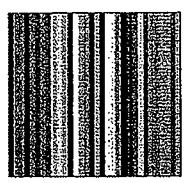
FIG. 2 is a diagram showing five types of test images (32 pixels×32 pixels).
Figure 2:
Figure 2:
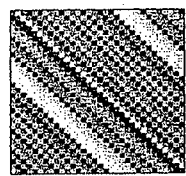
Figure 2:
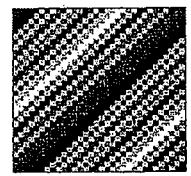
Figure 2:
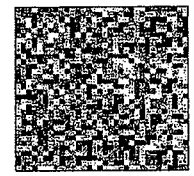

Hereinafter, gray scale images having 32 pixels×32 pixels in a vertically striped pattern, a horizontally striped pattern, a diagonally striped pattern and a random pattern shown in FIG. 2 are created, respectively, and an extent of the minimum gap, $\text{gap}_{min} = \min_j |\tau_j - \sigma_{j+1}|$, between singular values of matrix $X_*$ in the Kakarala-Ogunbona algorithm was examined. In a numerical experimentation, Matlab 6.5 was used on IBM Think Pad having a CPU of Pentium (registered trademark) M 1.2 GHz and a memory of 504 MB. A singular value decomposition of the matrix is obtained at double precision by an intrinsic function svd ( ) of Matlab.

Text images (a) to text images (e) shown in FIG. 2 are images, respectively, generated by randomly changing light and dark shading and thickness of a stripe and light and dark shading of a point. Components $X_k$ (where k=1, 2, ..., 1024) of a matrix are random integers of [0, 255]. 10,000 of such Xa, Xb, Xc, Xd and Xe are prepared, respectively.

$$X_a = \begin{pmatrix} x_1 & x_2 & \cdots & x_{32} \\ x_1 & x_2 & \cdots & x_{32} \\ \vdots & \vdots & & \vdots \\ x_1 & x_2 & \cdots & x_{32} \end{pmatrix},$$

$$X_b = \begin{pmatrix} x_1 & x_1 & \cdots & x_1 \\ x_2 & x_2 & \cdots & x_2 \\ \vdots & \vdots & & \vdots \\ x_{32} & x_{32} & \cdots & x_{32} \end{pmatrix},$$

$$X_c = \begin{pmatrix} x_{32} & \cdots & x_2 & x_1 \\ \vdots & \ddots & \ddots & x_2 \\ x_{62} & \ddots & \ddots & \vdots \\ x_{63} & x_{62} & \cdots & x_{32} \end{pmatrix},$$

$$X_d = \begin{pmatrix} x_1 & x_2 & \cdots & x_{32} \\ x_2 & x_3 & \cdots & x_{33} \\ \vdots & \vdots & \ddots & \vdots \\ x_{32} & x_{33} & \cdots & x_{63} \end{pmatrix},$$

$$X_e = \begin{pmatrix} x_1 & x_2 & \cdots & x_{32} \\ x_{33} & x_{34} & \cdots & x_{64} \\ \vdots & \vdots & \ddots & \vdots \\ x_{993} & x_{994} & \cdots & x_{1024} \end{pmatrix}.$$

[Expression 7]

Figure 3:
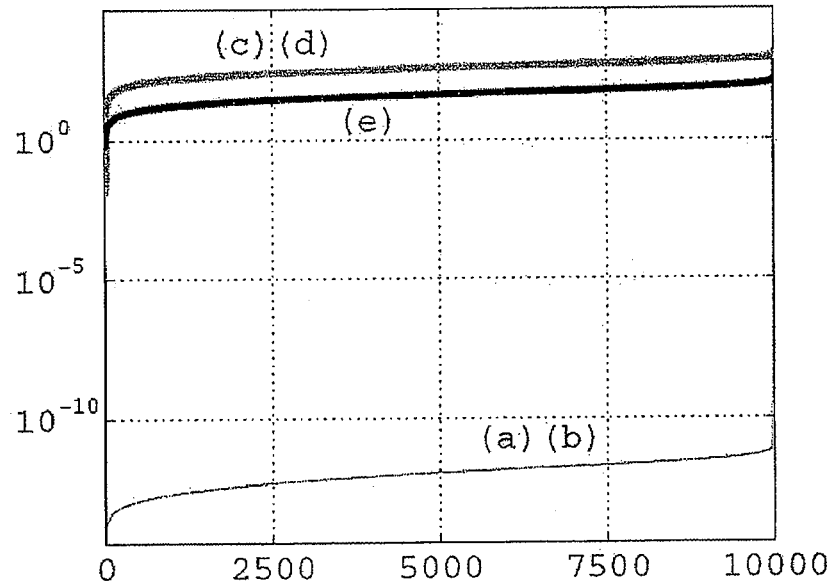
FIG. 3 is a diagram showing the minimum $gap_{min}$ between singular values, which the matrix T targeted for a singular value decomposition has, when 10,000 of images of five types are divided into quadrants.
Figure 4:
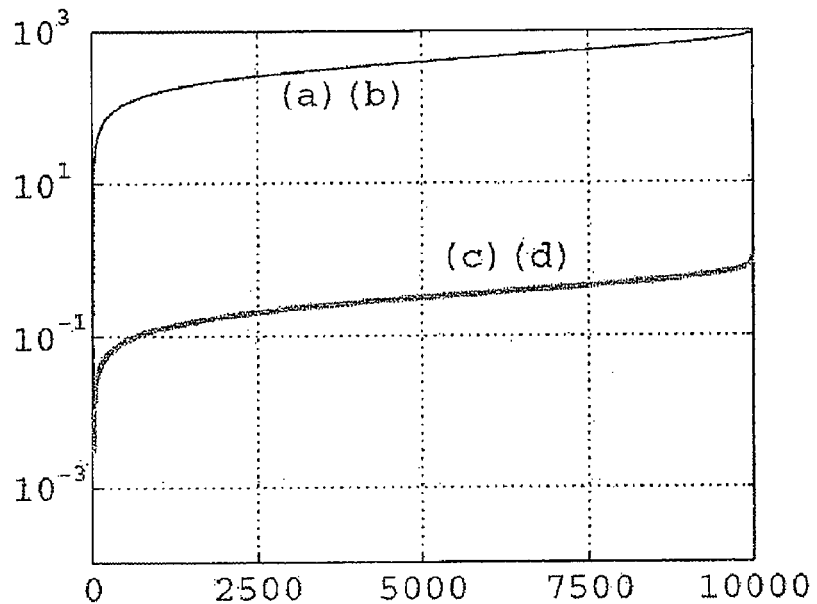
FIG. 4 is a diagram showing the minimum $gap_{min}$ between singular values, which the matrix T targeted for a singular value decomposition has, when 10,000 of images having frames of four types are respectively divided.

10,000 of image (a) and image (b) were divided into quadrants, respectively, and the values of the $\text{gap}_{min}$ thereof show a similar tendency, in which in most cases, the $\text{gap}_{min}$ is less than $10^{-10}$. As shown in Table 1, it was found out that in the case where singular values were most adjacent to each other, the $\text{gap}_{min}$ had an extremely small value of approximately machine epsilon. On the other hand, in the case of image (c) and image (d), in most cases, the $\text{gap}_{min} > 1$, as shown in FIG. 3. However, as shown in Table 1, there were cases in which the gap$_{min}$ became 0 and singular values of the matrix X* overlapped each other. In the case of image (e), it is found out that singular values were more dispersed than the other cases of the images, in which largely, the gap$_{min}$>1 and even in the most adjacent case of singular values to each other, gap$_{min}$=0.52.

TABLE 1

Minimum gap, gap$_{min}$, between singular values of matrix T targeted for singular value decomposition when 10,000 of five types of images are divided into quadrants.

| | gap$_{min}$ | |
| --- | --- | --- |
| | maximum value | minimum value |
| (a) vertical stripe | 2.0E+03 | 1.4E−16 |
| (b) horizontal stripe | 2.2E+03 | 2.7E−15 |
| (c) diagonal stripe I | 1.1E+03 | 0.0E−00 |
| (d) diagonal stripe II | 9.9E+02 | 0.0E+00 |
| (e) ramdom stripe | 1.5E+02 | 5.2E−01 |

(Maximum value and minimum value of gap$_{min}$ when gap$_{min}$ is obtained for every 10000 images)

In a double precision computation, it is considered that singular vectors having good orthogonality are computed if the gap$_{min}$>10$^{-3}$ more or less [6]. In this case, an image which always satisfies this condition is only image (e). In the case of images having some regularity such as image (a) to image (d), a singular value decomposition of matrix X* is not performed at high precision in the Kakarala-Ogunbona algorithm, thus resulting in a possibility that a finely compressed image cannot be obtained.

4. Enlarged Image

If original image X has some regularity, it is not certain if a singular value decomposition in the Kakarala-Ogunbona algorithm can be realized at high precision. In other words, the minimum gap, gap$_{min}$, between singular values of matrix X, which is generated from original image X is small, a fine image divided into quadrants is not always obtained. The present chapter will examine X bar, in which a randomly patterned frame is added around original image X, thereby breaking the regularity of original image X. Herein, "X bar" is a synonym of a representation having a horizontal line added above X. A size of the original image is 32 pixels and 32 pixels, and a block size in the Kakarala-Ogunbona algorithm is b=2.

First, 32×34 matrix $$\overline{X} = \begin{pmatrix} d_1 & d_2 \\ d_3 & d_4 \\ \vdots & \vdots \\ d_{63} & d_{64} \end{pmatrix} \quad X \quad \Bigg)$$ [Expression 8]

for representing an enlarged image having a frame of 2 pixels added on the left side will be mathematically examined (where d$_k$ (k=1, 2, . . . , 64) is a random integer of [0, 255]). In (1) to (4) of the Kakarala-Ogunbona algorithm, X is transformed into 4×256 matrix T and X bar is transformed into 4×272 matrix T bar, respectively. Thus, T bar can be represented as:

$$\overline{T}=(DT)$$ [Expression 9]

by T and 4×16 matrix D, which corresponds to the image of the frame (where a component of D is d$_k$ (k=1, 2, . . . , 64). In this case, $$\overline{TT}^T = DD^T + TT^T$$ [Expression 10]

Thus, it is recognized that as D is varied, T bar (T bar)$^T$ has have a different fixed value distribution than that of TT$^T$. In other words, if D is controlled well, it is possible for T bar to be a matrix not having singular values adjacent to each other. Herein, "X bar" is a synonym of a representation having a horizontal line added above X.

Further to the left side, enlarged image X bar having frames of an arbitrary size added on the right side, the upper side and the lower side are transformed by (1) to (4) of the Kakarala-Ogunbona algorithm into $$\overline{T}=(D_1T_1D_2 \ldots D_{32}T_{32}D_{33})$$ [Expression 11]

(where D$_k$ (k=1, 2, . . . , 32) is a matrix or a vector having 4 rows, which corresponds to the image of the frame on one of the upper side, the lower side, the left side and the right side, and T=(T$_1$ T$_2$ . . . T$_{32}$). As in the case where the frame has only been added to the left side, $$\overline{TT}^T = DD^T + TT^T$$ [Expression 12]

$$DD^T \equiv \sum_{k=1}^{33} D_k D_k^T$$

is established. Accordingly, when an image having a frame is targeted for a division into quadrants, it is possible to avoid a singular value decomposition of a matrix having a small value of gap$_{min}$. In addition, it should be noted that singular values do not change even if rows in T bar are exchanged therein, and orthogonal matrix U does not change even if columns in T bar are exchanged therein.

In a commonly used singular value decomposition algorithm, a relative gap of singular values is enlarged by a datum shift. Therefore, the precision of the singular value to be obtained barely depends on the value of gap$_{min}$. There are singular value computation methods having a high relative precision, such as dqds algorithm [7] and mdLVs algorithm [4].

An image compression requires some components of a singular vector, not a singular value. Based on this, it is possible to formulate a new algorithm for computing singular vectors at high precision by enlarging a relative gap of singular values.

The enlarged image is not limited to the one obtained by adding a frame to the left side of an original image. The enlarged image can be obtained by adding a frame to at least one of the sides of the original image. In addition, a width or a length of the frame is not limited to 2 pixels×2 pixels. The width and the length of the frame can be a predetermined number of pixels. The number of pixels of the width and the length of the frame can be designed, for example, depending on the property of an original image. A value of each element d$_k$, corresponding to the frame, is not limited to a random value. A similar effect can be obtained if the value of each element d$_k$ corresponding to the frame is substantially a random value (e.g., pseudorandom value).

Hereinafter, an algorithm for dividing image X into quadrants at high precision will be proposed.

Algorithm for Dividing into Quadrants at High Precision

Step 1: X is transformed into T by (1) to (4) of the Kakarala-Ogunbona algorithm. T is considered as T bar.

Step 2: Singular values of T bar are obtained.

If $gap_{min} \geq \epsilon$, a singular value decomposition of T bar, T bar=$USV_T$, is obtained.

If $gap_{min} \leq \epsilon$, (D (T bar)) is considered as T bar and then the process goes back to Step 2 (where D is 4×n' matrix having the components thereof given by a random integer of [0, 255], and n' corresponds to a size of a frame).

A value of $\epsilon$ should be set depending on which singular value decomposition algorithm is used; however, it is not preferable to have a small value around machine epsilon as $\epsilon$.

Step 3: UT effects, from the left side, T having no information of the frame. That is, $U^T T$ is considered as $T_1$.

Step 4: Image $X_1$ to be divided into quadrants is obtained by (6) and (7) of the Karala-Ogunbona algorithm.

This algorithm has a mechanism of creating an image divided into quadrants by temporarily adding a frame, if singular values are adjacent to each other, and removing the frame immediately after a singular value decomposition.

A numerical experimentation was conducted in order to demonstrate an effect (especially, effect of Step 2) of the algorithm for dividing into quadrants. Similar to Chapter 3, image (a) to image (e) in FIG. 2 are used as original images, and random frames of 2 pixels are added to the upper side and the left side so as to create enlarged images, respectively.

TABLE 2

Minimum value of minimum gap, $gap_{min}$, between singular values of matrix T targeted for singular value decomposition when 10,000 of five types of images having a frame are divided into quadrants.

| | Minimum value of $gap_{min}$ |
|---|---|
| (a) vertical stripe | 7.8E−04 |
| (b) horizontal stripe | 1.5E−03 |
| (c) diagonal stripe I | 5.8E−03 |
| (d) diagonal stripe II | 4.1E−03 |
| (e) ramdom stripe | 3.2E−01 |

T bar generated from 10,000 of enlarged images of image (a) and image (b), respectively, has a gap between singular values of $gap_{min}>10$. Even in the most adjacent case of singular values of matrix T bar to each other, values of $gap_{min}$ are $7.8 \times 10^{-4}$ in image (a) and $1.5 \times 10^{-3}$ in image (b), respectively, as shown in Table 2. It can be recognized that clusters of singular values are more dispersed than those without frames shown in Chapter 3. In enlarged images of image (c) and image (d), $gap_{min}$ of T bar is 0.1 or more in many case, and singular values of T bar are more slightly adjacent to each other than an image without frame, which, however, is not nearly a level of obstructing the performance of singular value decomposition at high precision. Even at worst, $gap_{min}$ is suppressed to $O(10^{-3})$, thus resulting in the avoidance of situation in which T bar has overlapping singular values. In image (e), the value of $gap_{min}$ does not significantly change even if a frame is added since the original image does not have any regularity.

In an image compression system (method) for creating a reduced approximated image and edge extracted images in the vertical direction, the horizontal direction and the diagonal direction to be divided into quadrants based on an original image, the description has been given regarding the block singular value decomposition of Kakarala-Ogunbona, which is one of the useful means for compressing an image. Five types of the test images were divided into quadrants by the Kakarala-Ogunbona algorithm. In the image having regularity, matrices having adjacent singular values or overlapping singular values appeared in the process of the algorithm in some cases. Since it has been reported that as a gap between singular values becomes smaller, the precision of a singular vector is decreased. Accordingly, in the present invention, the algorithm for dividing into quadrants was formulated which enlarges a relative gap of singular values and dispersing clusters thereof. Even though this is a simple idea of adding a frame of a random pattern to an original image and dividing the image into quadrants, both the theory and the experiment show the avoidance of a situation having difficulty of performing a high precise singular value decomposition.

5. Image Compression

Figure 5:
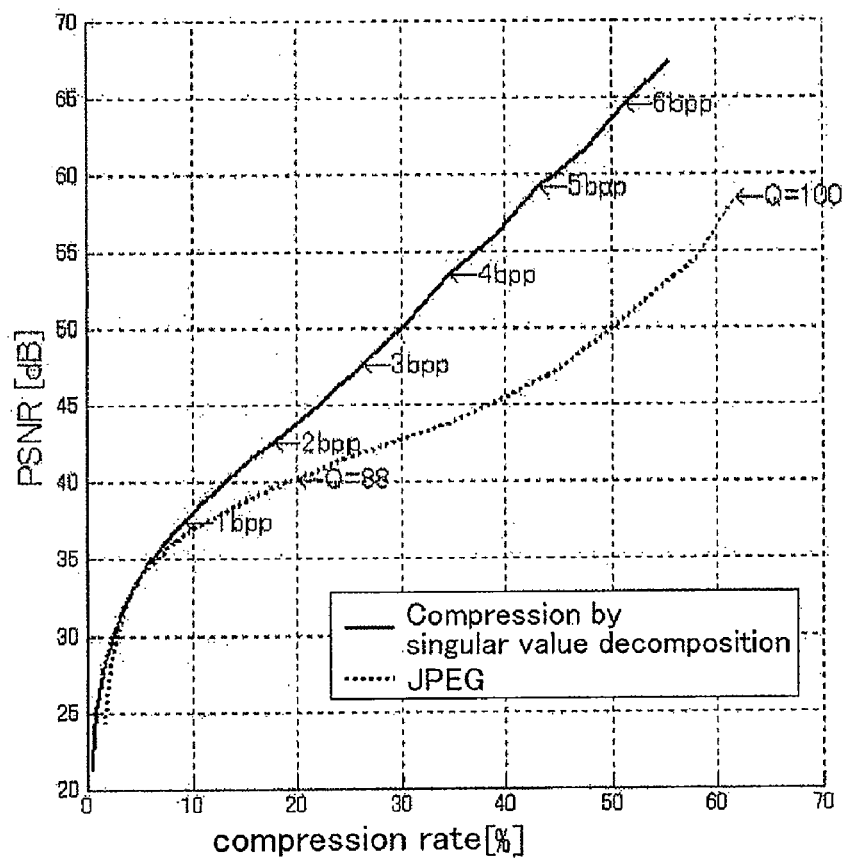
FIG. 5 is a diagram showing a relationship between a ratio of file size with respect to an original image and a PSNR value of a compressed image.

When a compressed image was generated with a combination of the proposed algorithm for dividing into quadrants and SPHIT coding, a result shown in FIG. 5 was obtained. A horizontal axis in FIG. 5 shows a ratio of file size with respect to an original image (highly compressed toward the left side). A vertical axis in FIG. 5 shows PSNR value (finely compressed toward the upper side). In FIG. 5, a solid line shows a characteristic of an image compression according to the present invention and a dotted line shows, as a comparative example, a characteristic of an image compression by well-known JPEG. It can be recognized from FIG. 5 that the image compression according to the present invention can always compress images more finely than JPEG at the same compression rate.

In addition, if singular values of matrix T are dispersed from each other, PSNR values barely show a difference even if a singular value decomposition is obtained with any one of a double precision arithmetic, a single precision arithmetic and an integer arithmetic.

TABLE 3

PSNR value of a compressed image obtained when an image divided into multisections is obtained by a double precision arithmetic, a single precision arithmetic and an integer 16 bit arithmetic and SPHIT coding is performed (original image: Lena).

| bpp | double precision | single precision | integer 16 bit |
|---|---|---|---|
| 0.1 | 26.76 | 26.76 | 26.76 |
| 0.5 | 83.47 | 33.47 | 33.47 |
| 1.0 | 37.42 | 37.42 | 37.41 |
| 1.5 | 40.2 | 40.2 | 40.2 |

It is, of course, possible to perform a singular value decomposition with the integer arithmetic at the highest speed and also possible to reduce an amount of information (can be more compressed). However, in the case of the integer arithmetic, there is a higher possibility that PSNR value becomes more aggravated than the double precision arithmetic when there are adjacent or overlapping singular values. Therefore, when an image compression is performed with, in particular, the integer arithmetic, it is considered to be necessary to use the proposed algorithm for dividing into multi-divided images.

In addition to SPHIT, coding can be performed by EZW, and they are coded using a run length coding and Shannon coding (Huffman coding, arithmetic coding) to further compress data. Data can be compressed in combination with LHA, gzip, bzip2, ZIP, CAB, 7z, RAR, CAB, DGCA, GCA and the like, all of which use LZ77 as their basic algorithm.

6. Detail of Image Compression Method

Hereinafter, a method for compressing an image represented by l×m image matrix X will be described in detail with reference to FIG. 6 to FIG. 16. The image represented by l×m image matrix X can be a gray scale image or a color image.

Figure 6:
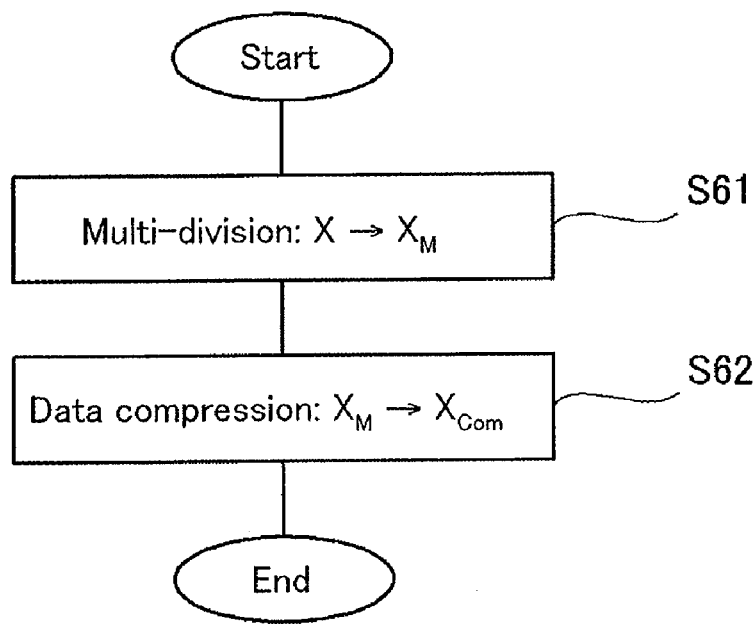
FIG. 6 is a flowchart showing a procedure of the processes according to the image compression method of the present invention.

FIG. 6 is a flowchart showing a procedure of the processes according to the image compression method of the present invention. The processes can be performed by an arbitrary processor.

Step S61: Original image X is transformed into multi-divided image $X_M$ (multi-division: $X \rightarrow X_M$). Herein, original image X is represented in a format of l×m matrix (herein after, referred to as l×m image matrix X). Multi-divided image $X_M$ is an image obtained by performing $k^2$ division at least once, and it is represented in a format of a matrix (herein after, referred to as multi-divided image matrix $X_M$) (where k is an integer greater than or equal to 2, and l and m are arbitrary multiples of k, respectively). Obtaining multi-divided image $X_M$ is nothing but performing a feature extraction of original image X.

Step S62: A data compression process is performed on multi-divided image matrix $X_M$. As a result, compressed image matrix $X_{com}$ is obtained (data compression: $X_M \rightarrow X_{com}$).

Here, image matrix X which is input in step S61; multi-divided image matrix $X_M$ which is output in step S61 and input in step S62; and compressed image matrix $X_{com}$ which is output in step S62 can be stored in an arbitrary storage device (medium).

Figure 7:
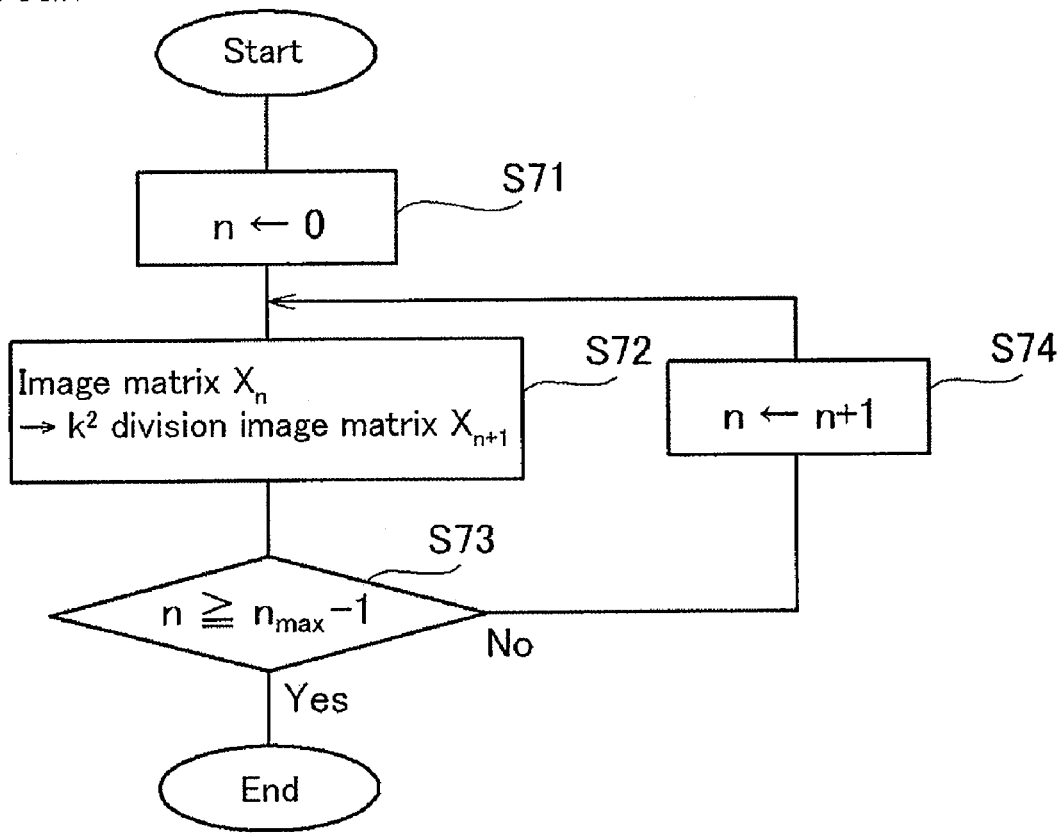
FIG. 7 is a flowchart showing a procedure of the multi-dividing process (step S61 in FIG. 6).

FIG. 7 is a flowchart showing a procedure of the multi-dividing process (step S61 in FIG. 6).

In step S72, a process of dividing image matrix $X_n$ by $K^2$ in order to generate image matrix $X_{n+1}$ is performed at least once (where n=0, 1, ..., $n_{max-1}$, $X_0$=X).

Here, number n of divisions and image matrix $X_n$ can be both stored in an arbitrary storage device (medium).

Figure 8:
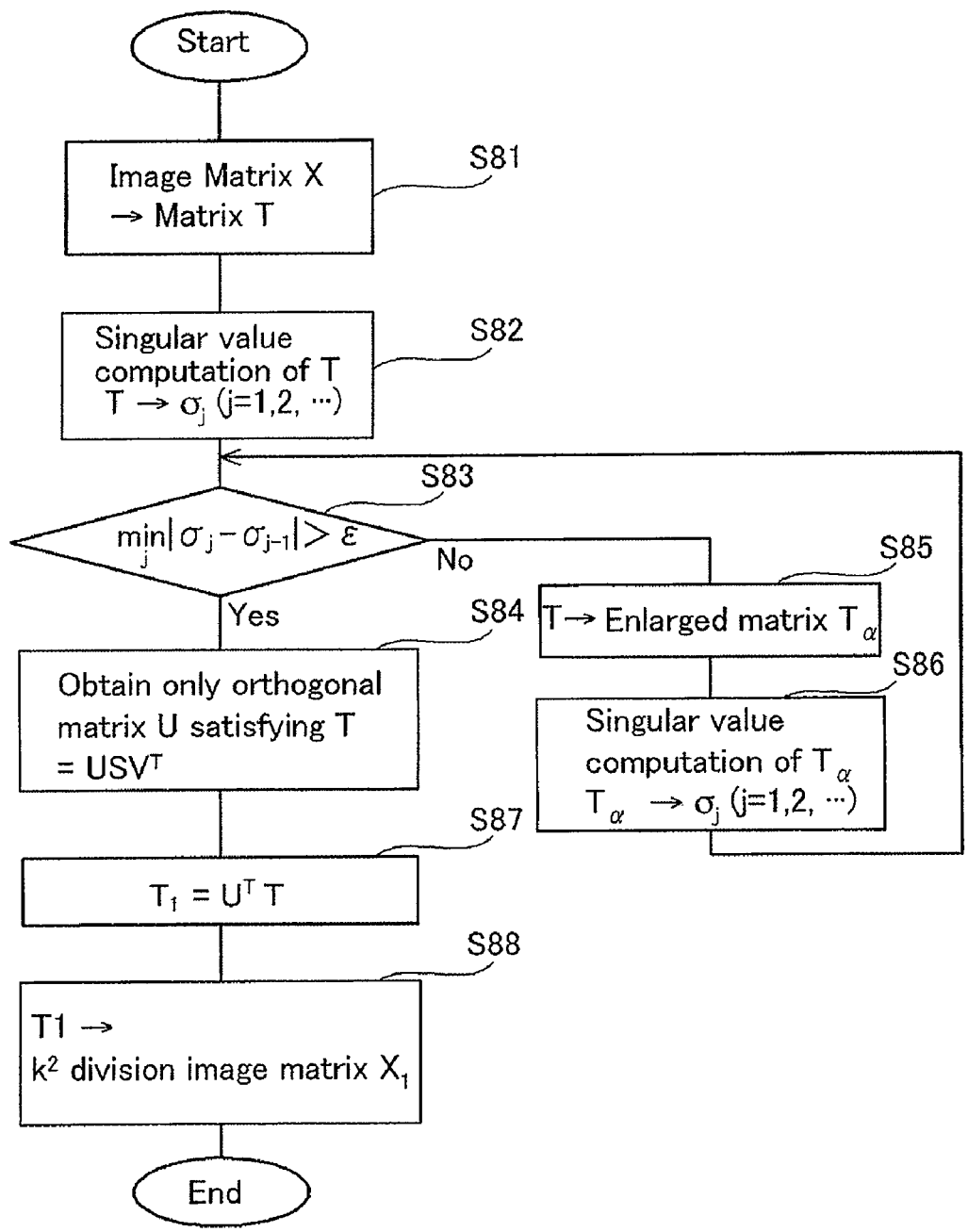
FIG. 8 is a flowchart showing a procedure of the processes of dividing image matrix $X_n$ by $K^2$ in order to generate image matrix $X_{n+1}$ (step S72 in FIG. 7).

FIG. 8 is a flowchart showing a procedure of the processes of dividing image matrix $X_n$ by $K^2$ in order to generate image matrix $X_{n+1}$ (step S72 in FIG. 7). Herein, the case of n=0 will be described. However, the description can be similarly applied to the case of n=1, ..., $n_{max-1}$.

Step S81: $K^2 \times (lm/K^2)$ matrix T is created based on l×M image matrix X. This step corresponds to (1) to (4) of the Kakarala-Ogunbona algorithm described above.

Step S82: Singular values $\sigma_1, \sigma_2, ..., \sigma_{k^2}$ of T are computed (where $\sigma_1 \geq \sigma_2 \geq ... \geq \sigma_{k^2}$).

Step S83: It is determined whether or not $\min_j |\sigma_j - \sigma_{j-1}| > \epsilon$ (where $\epsilon$ shows a constant greater than or equal to machine epsilon). If the result of the determination in step S83 is "Yes", the process proceeds to step S84. If the result of the determination in step S83 is "No", the process proceeds to step S85 (in steps S85 and S86, singular values $\sigma_1, \sigma_2, ..., \sigma_{k^2}$ of enlarged matrix $T_\alpha$ are computed).

Step S84: only U which satisfies $T=USV^T$ is obtained (where S=diag ($\sigma_1, \sigma_2, ..., \sigma_{k^2}$), U is an orthogonal matrix and V is an orthogonal matrix).

Step S85: Matrix T is transformed into enlarged matrix $T_\alpha$. Enlarged matrix $T_\alpha$ is generated based on matrix T and a frame added to at least a portion of at least one side of image matrix X. The frame has a size of at least k pixels and k pixels. Values of the pixels belonging to the frame are random values (or substantially random values).

Step S86: Singular values $\sigma_1, \sigma_2, ..., \sigma_{k^2}$ of $T_\sigma$ are computed (where $\sigma_1 \geq \sigma_2 \geq ... \geq \sigma_{k^2}$). The singular values of $T_\sigma$ are input in step S83 (in step S83, it is newly determined whether or not $\min_j |\sigma_j - \sigma_{j-1}| > \epsilon$).

Hence, until $\min_j |\sigma_j - \sigma_{j-1}| > \epsilon$ is satisfied, steps S85 and S86 are repeated.

Step S87: Matrix $T_1 = U^T T$ is obtained. Matrix $T_1$ is called feature extraction matrix.

Step S88: Image matrix $X_1$ is created based on matrix $T_1$. Image matrix $X_1$ is a matrix obtained by dividing matrix X by $K^2$. This step corresponds to (6) to (7) of the Kakarala-Ogunbona algorithm described above.

Here, image matrix X, matrix $T_1$, matrix S, singular values $\sigma_1, \sigma_2, ..., \sigma_{k^2}$, enlarged matrix $T_\alpha$, orthogonal matrix U, image matrix $X_1$ divided by $K^2$ and feature extraction matrix $T_1$ can be all stored in an arbitrary storage device (medium).

Figure 9:
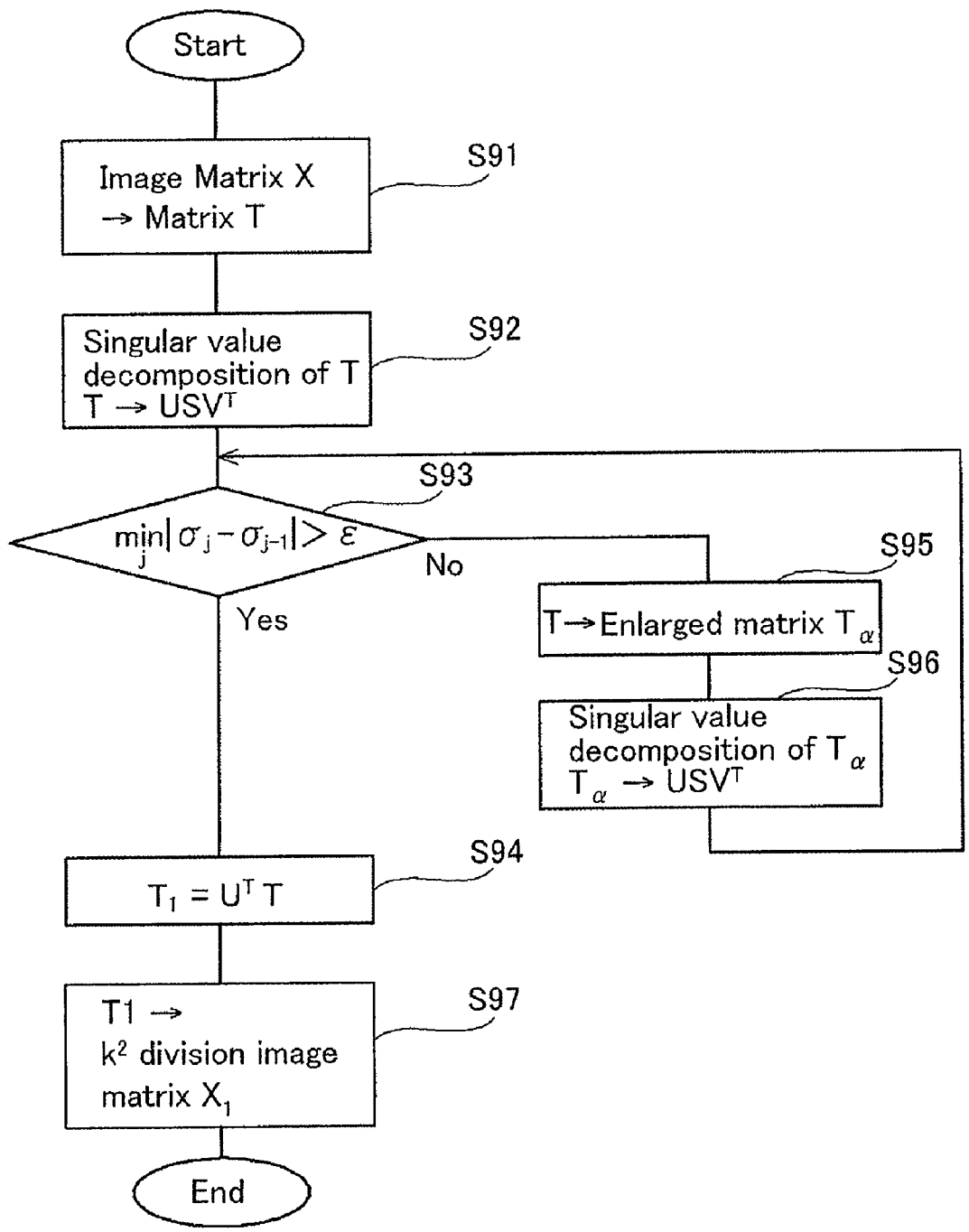
FIG. 9 is a flowchart showing another procedure of the processes of dividing image matrix $X_n$ by $K^2$ in order to generate image matrix $X_{n+1}$ (step S72 in FIG. 7).

FIG. 9 is a flowchart showing another procedure of the processes of dividing image matrix $X_n$ by $K^2$ in order to generate image matrix $X_{n+1}$ (step S72 in FIG. 7). Herein, the case of n=0 will be described. However, the description can be similarly applied to the case of n=1, ..., $n_{max-1}$.

Step S91: $K^2 \times (lm/K^2)$ matrix T is created based on l×M image matrix X. This step corresponds to (1) to (4) of the Kakarala-Ogunbona algorithm described above.

Step S92: A singular value decomposition of T, $T=USV^T$, is obtained (where S=diag ($\sigma_1, \sigma_2, ..., \sigma_{k^2}$), $\sigma_1, \sigma_2, ..., \sigma_{k^2}$ are singular values of T satisfying $\sigma_1 \geq \sigma_2 \geq ... \geq \sigma_{k^2}$, U is an orthogonal matrix and V is an orthogonal matrix).

Step S93: It is determined whether or not $\min_j |\sigma_j - \sigma_{j-1}| > \epsilon$ (where $\epsilon$ shows a constant greater than or equal to machine epsilon). If the result of the determination in step S93 is "Yes", the process proceeds to step S94. If the result of the determination in step S93 is "No", the process proceeds to step S95 (in steps S95 and S96, singular value decomposition of enlarged matrix $T_\alpha$ is performed).

Step S94: Matrix $T_1 = U^T T$ is obtained. Matrix $T_1$ is called feature extraction matrix.

Step S95: Matrix T is transformed into enlarged matrix $T_\alpha$. Enlarged matrix $T_\alpha$ is generated based on matrix T and a frame added to at least a portion of at least one side of image matrix X. The frame has a size of at least k pixels and k pixels. Values of the pixels belonging to the frame are random values.

Step S96: The singular value decomposition of T, $T=USV^T$, is obtained, where S=diag ($\sigma_1, \sigma_2, ..., \sigma_{k^2}$), $\sigma_1, \sigma_2, ..., \sigma_{k^2}$ is a singular value of $T_\sigma$ which satisfies $\sigma_1 \geq \sigma_2 \geq ... \geq \sigma_{k^2}$, U is an orthogonal matrix, and V is an orthogonal matrix. The singular values of $T_\sigma$ are input in step S93 (in step S93, it is newly determined whether or not $\min_j |\sigma_j - \sigma_{j-1}| > \epsilon$).

Hence, until $\min_j |\sigma_j - \sigma_{j-1}| > \epsilon$ is satisfied, steps S95 and S96 are repeated.

Step S97: Image matrix $X_1$ is created based on matrix $T_1$. Image matrix $X_1$ is a matrix obtained by dividing matrix X by $K^2$. This step corresponds to (6) to (7) of the Kakarala-Ogunbona algorithm described above.

Here, image matrix X, matrix $T_1$, matrix S, singular values $\sigma_1, \sigma_2, ..., \sigma_{k^2}$, enlarged matrix $T_\alpha$, orthogonal matrix U, image matrix $X_1$ divided by $K^2$ and feature extraction matrix $T_1$ can be all stored in an arbitrary storage device (medium).

A singular value decomposition of T and $T_\sigma$ can be performed with a floating-point arithmetic. Alternatively, the singular value decomposition of T and $T_\sigma$ can be performed with an integer arithmetic.

Figure 10:
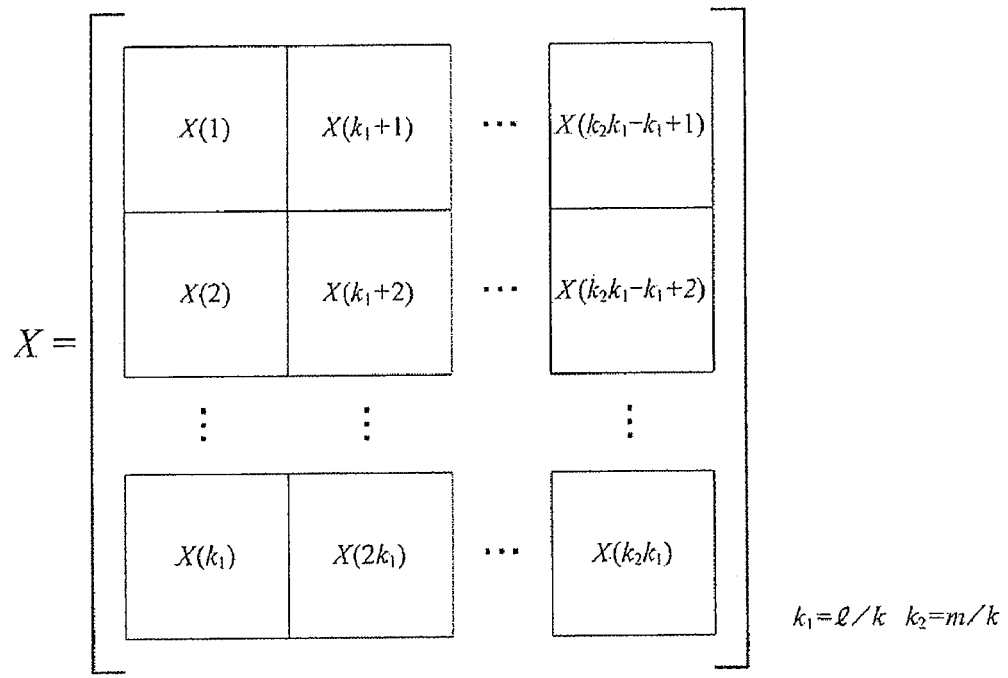
FIG. 10 is a diagram schematically showing a process of creating $k^2 \times (lm/k^2)$ matrix X based on l×m image matrix X (step S81 in FIG. 8 and step S91 in FIG. 9).
Figure 10:
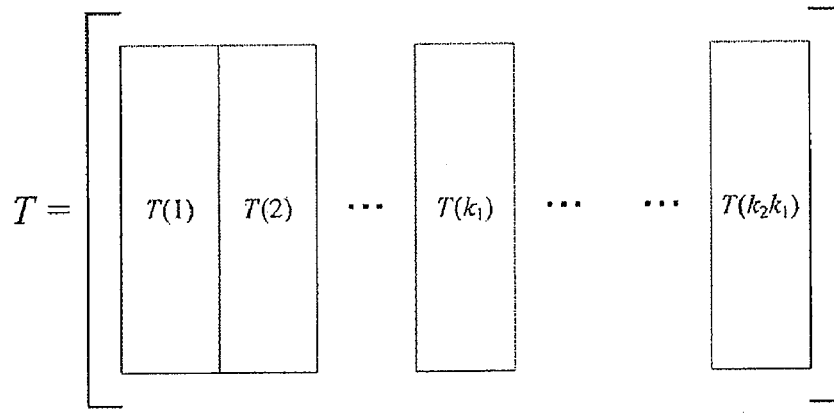

FIG. 10 schematically shows a process of creating $k^2 \times (lm/k^2)$ matrix X based on l×m image matrix X (step S81 in FIG. 8 and step S91 in FIG. 9).

Figure 11:
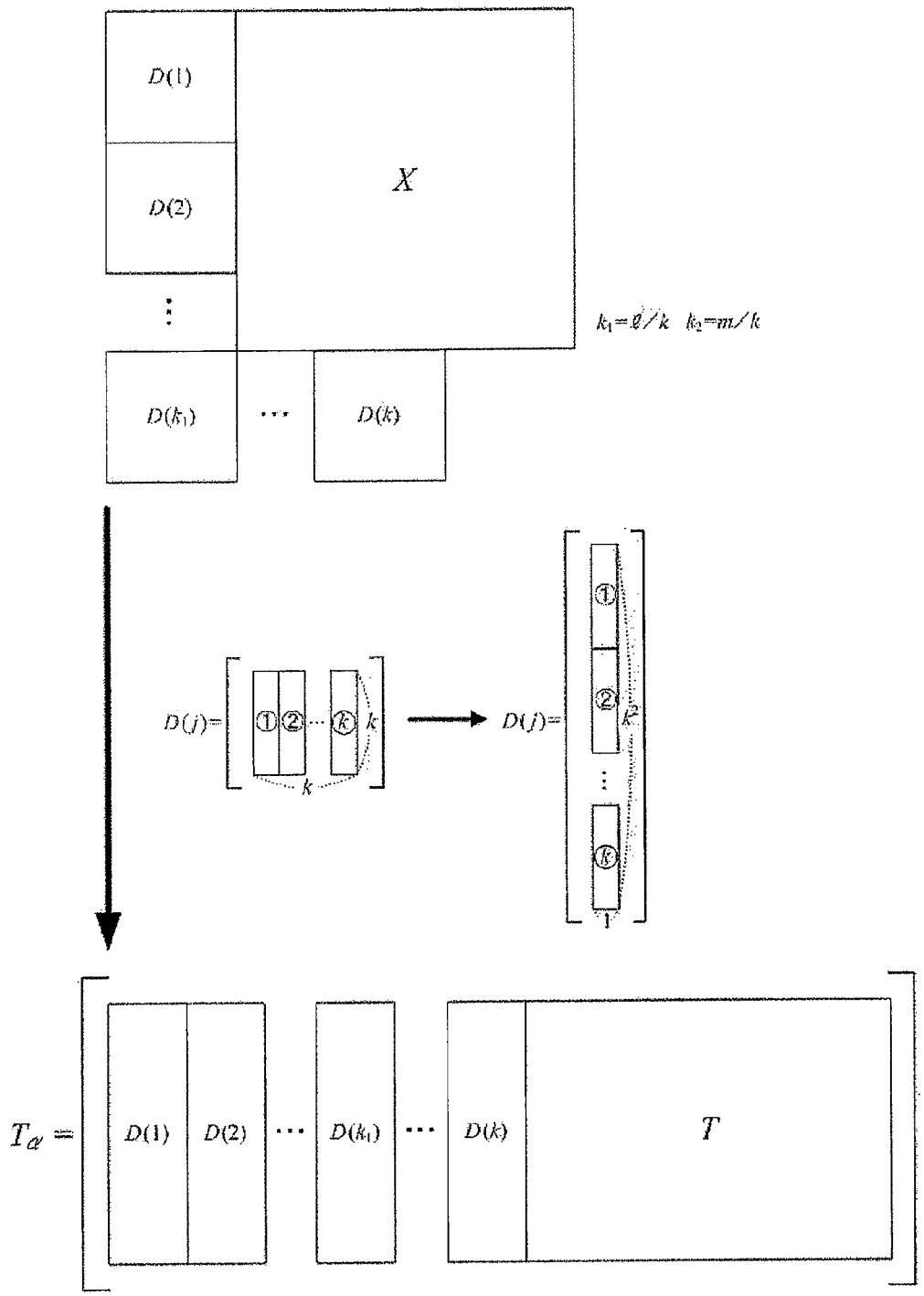
FIG. 11 is a diagram schematically showing a process of transforming matrix T into enlarged matrix $T_\alpha$ (step S85 in FIG. 8 and step S95 in FIG. 9).

FIG. 11 schematically shows a process of transforming matrix T into enlarged matrix $T_\alpha$ (step S85 in FIG. 8 and step S95 in FIG. 9).

Figure 12:
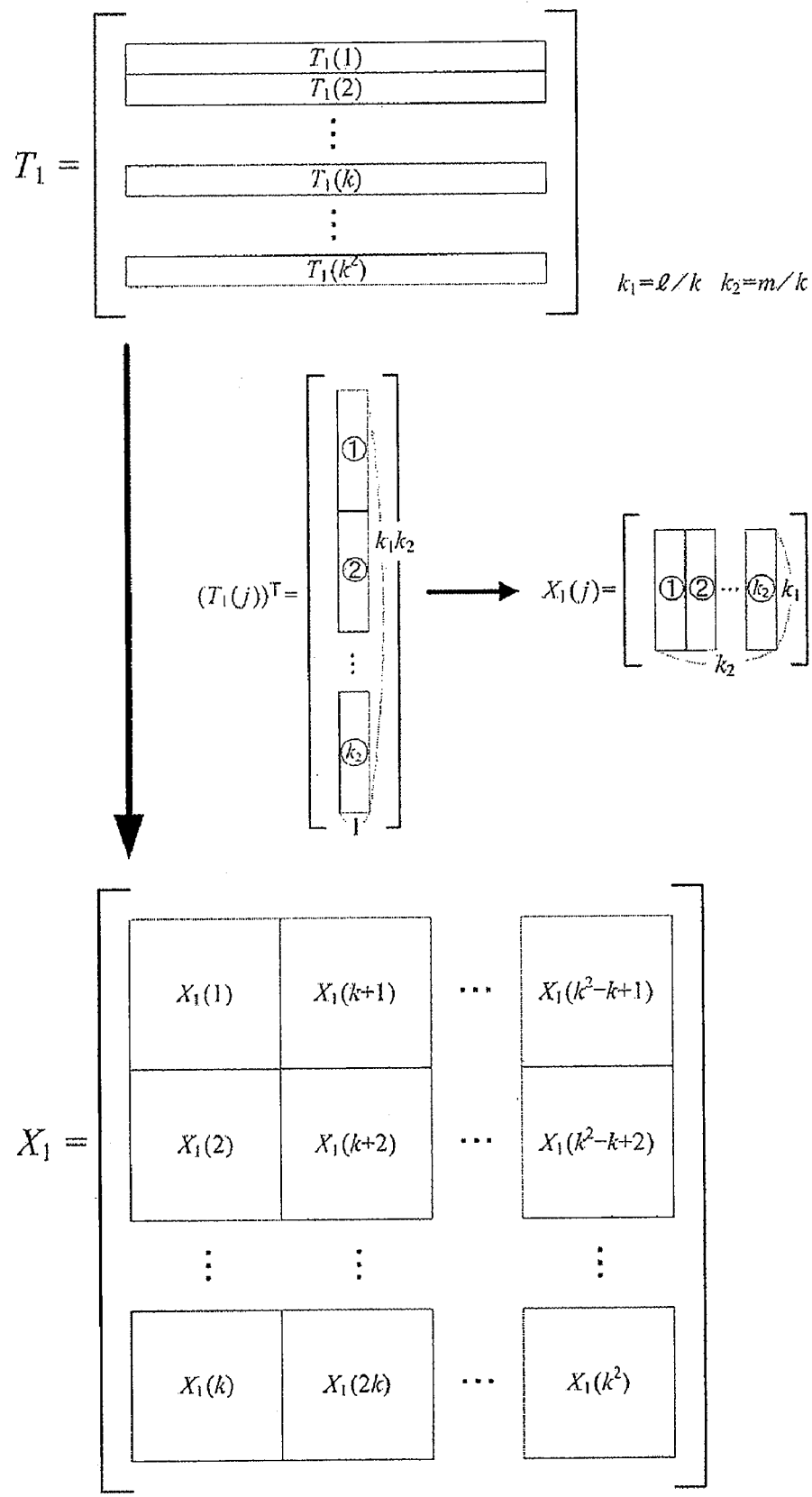
FIG. 12 is a diagram schematically showing a process of creating image matrix $X_1$ based on matrix $T_1$ (step S88 in FIG. 8 and step S97 in FIG. 9).

FIG. 12 schematically shows a process of creating image matrix $X_1$ based on matrix $T_1$ (step S88 in FIG. 8 and step S97 in FIG. 9).

In step S85 in FIG. 8 and step S95 in FIG. 9, it is not necessary to add a frame for image matrix X to all of the sides of image matrix X, but add at least one side of image matrix X. Further, it is not necessary to add a frame for image matrix X to at least one entire side of image matrix X, but add at least a portion of at least one side of image matrix X.

Figure 13:
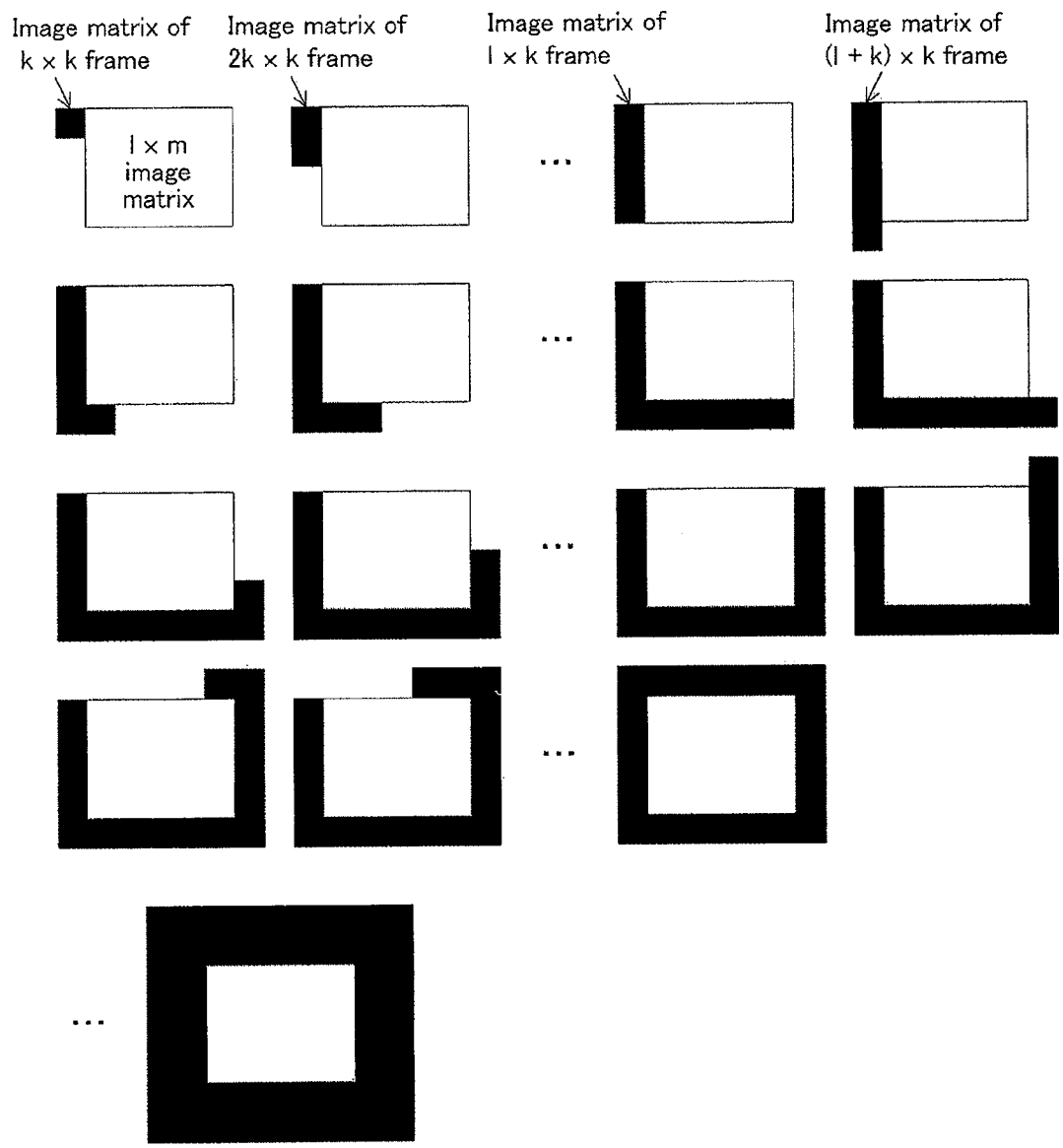
FIG. 13 is a diagram showing a variation of patterns of frames to be added to image matrix X when image matrix X is l×m matrix.
Figure 14:
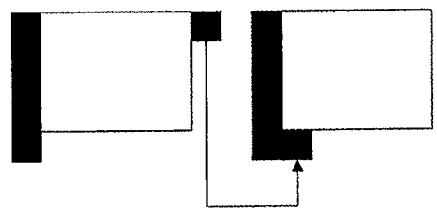
FIG. 14 is a diagram explaining a case where the position of a frame to be added to an image matrix is moved.

FIG. 13 shows a variation of patterns of frames to be added to image matrix X when image matrix X is l×m matrix. In FIG. 13, portions in black correspond to the frames, respectively. When $K^2$ division is performed, only a frame at least having a size of k pixels×k pixels is added to image matrix X.

It is important what values pixels belonging to the frame to be added to image matrix X have; however, it is not important to which part of image matrix X the frame is added. The same result is obtained even if a position of a frame is moved, as shown by an arrow in FIG. 14. Values of pixels belonging to the frame are, for example, random values. Alternatively, the values of the pixels belonging to the frame can be substantially random values (e.g., pseudorandom values).

The multi-dividing process performed in step S61 shown in FIG. 6 can be performed in combination with $K^2$ dividing process shown in FIG. 8 and an existing $K^2$ dividing process such as a Wavelet transformation. Alternatively, the multi-dividing process performed in step S61 shown in FIG. 6 can be performed in combination with $K^2$ dividing process shown in FIG. 9 and an existing $K^2$ dividing process such as a Wavelet transformation.

Figure 15:
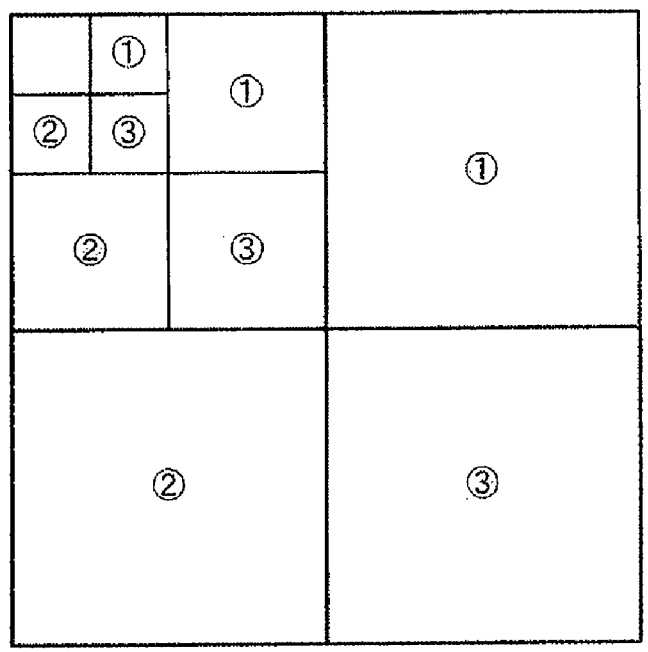
FIG. 15 is a diagram showing an example of dividing areas having similar features extracted therefrom.

It is preferable to perform the data compression process performed in step S62 shown in FIG. 6 by utilizing a similarity among images of the areas which have been divided. As described above, when $K^2$ division is repeated n times, $(k^2-1)$ sets of n number of areas having different sizes but similar features extracted therefrom appear. For example, FIG. 15 shows areas having similar features extracted therefrom with the same reference number in a circle when the division into quadrants is repeated three times. In the example shown in FIG. 15, images of three areas (1) are images similar to each other, images of three areas (2) are images similar to each other, and images of three areas (3) are images similar to each other. By utilizing the similarity of images among areas, it is possible to reduce a required data amount when compared to the case of simply storing multi-divided image matrix $X_M$. In such a method of utilizing the similarity of images among areas, only a difference value of pixel values can be stored, or alternatively, the value 0 can be simply stored if the similarity of the images is high even though the difference value should be basically stored with double precision number of 16 digits. Such a data compression process can be, for example, implemented by SPHIT or EZW.

Further, data can be compressed using a run length coding and Shannon coding (Huffman coding, arithmetic coding). In addition, Data can be compressed in combination with LHA, gzip, bzip2, ZIP, CAB, 7z, RAR, CAB, DGCA, GCA and the like, all of which use LZ77 as their basic algorithm.

Further, the embodiments above have described the examples of extracting a feature of an image, having a vertical and horizontal size multiplied by k, by using l×m image matrix X (where k is an arbitrary number greater than or equal to 2, and l and m are arbitrary multiples of k, respectively). However, the present invention is not limited to this. In the case of extracting a feature of an image having a vertical and horizontal size not multiplied by k, an appropriate number of rows and columns are added to at the lower side or the left side of an image matrix, for example. Thus, an image having a vertical and horizontal size multiplied by k is created, and a feature of the image can be extracted. Values of pixels belonging to a row or column to be added are, for example, 0. In this manner, a portion corresponding to the added row or column is removed from the feature-extracted image to obtain a desired result. Alternatively, instead of adding an appropriate number of rows or columns, by removing an appropriate number of rows or columns, an image having a vertical and horizontal size multiplied by k is created, and a feature of the image can be extracted.

Figure 16:
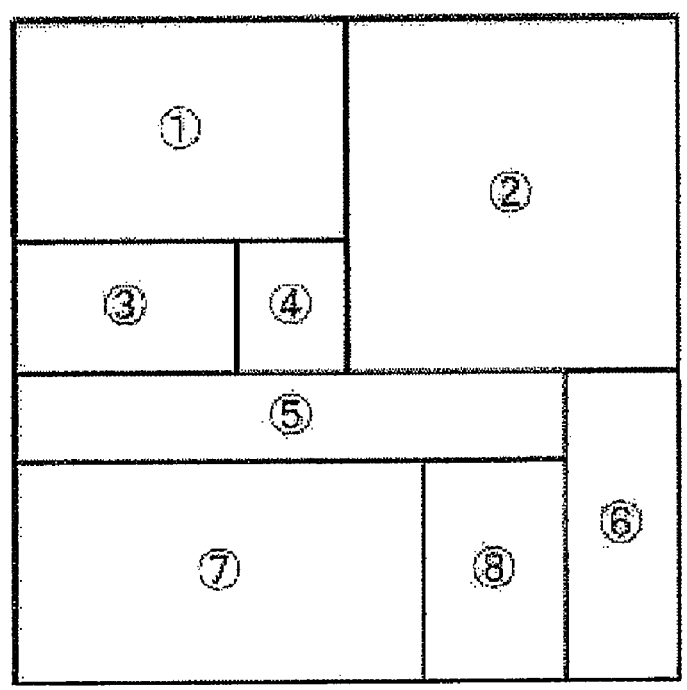
FIG. 16 is a diagram explaining a case where an image matrix is divided into a plurality of areas so as to individually perform the division by $K^2$ in each of the areas.

Further, the embodiments above have described the examples of dividing image matrix X by $K^2$. However, it is possible to divide image matrix X into several areas and then independently divide the several areas into $K^2$ sections. In this case, the number of division in the areas is not necessarily the same, but can be different from each other. For example, as shown in FIG. 16, it is possible to divide image matrix X into 8 areas (area (1) to area (8)) and divide the area (1) into 22 sections, divide the area (2) into $3^2$ sections . . . , respectively. In addition, it is possible to perform the division by $K^2$ in the areas in parallel.

As described above, the present invention is exemplified by the use of its preferred embodiments. However, the present invention should not be interpreted solely based on embodiments described above. It is understood that the scope of the present invention should be interpreted solely based on the claims. It is also understood that those skilled in the art can implement equivalent scope of technique, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention is useful for providing an image compression method capable of always realizing, at the same compression rate, a finer compression than that performed by JPEG, an image feature extraction method appropriate for the image compression method, and the like.

The invention claimed is:

1. An image feature extraction method for extracting a feature of an image, comprising the step of performing $k^2$ (k is an arbitrary integer greater than or equal to 2) dividing process at least once on a given image so as to convert the given image into a multi-divided image,
   wherein the $k^2$ dividing process comprises the steps of:
   a) creating matrix T based on image matrix X;
   b) computing singular values $\sigma_1, \sigma_2, \ldots, \sigma_{k^2}$ of the matrix T, where $\sigma_1 \geq \sigma_2 \geq \ldots \geq \sigma_{k^2}$;
   c) determining whether or not $\min_j |\sigma_j - \sigma_{j-1}| > \epsilon$, where $\epsilon$ shows a constant greater than or equal to machine epsilon;
   d) if the result of the determination in the step c) is "No" returning to the step c) subsequent to computing the singular values of enlarged matrix $T_\alpha$;
   e) if the result of the determination in the step c) is "Yes", obtaining U which satisfies $T=USV^T$, where $S=\text{diag}(\sigma_1, \sigma_2, \ldots, \sigma_{k^2})$, U is an orthogonal matrix and V is an orthogonal matrix;
   f) obtaining matrix $T_1 = U^T T$; and
   g) creating image matrix $X_1$ based on matrix $T_1$,
   wherein the computing the singular values of the enlarged matrix $T_\alpha$ in the step d) comprises the steps of:
   creating enlarged matrix $T_\alpha$ based on matrix T and a frame added to at least a portion of at least one side of image matrix X, the frame having a size of at least k pixels and k pixels; and
   computing singular values $\sigma_1, \sigma_2, \ldots, \sigma_{k^2}$ of the enlarged matrix $T_\alpha$, where $\sigma_1 \geq \sigma_2 \geq \ldots \geq \sigma_{k^2}$.

2. An image feature extraction method for extracting a feature of an image, comprising the step of performing $k^2$ (k is an arbitrary integer greater than or equal to 2) dividing process at least once on a given image so as to convert the given image into a multi-divided image, wherein the $k^2$ dividing process comprises the steps of:
a) creating matrix T based on image matrix X;
b) obtaining a singular value decomposition of the matrix T, $T=USV^T$, where $S=\text{diag}(\sigma_1, \sigma_2, \ldots, \sigma_{k^2})$, $\sigma_1, \sigma_2, \ldots, \sigma_{k^2}$ are singular values of T satisfying $\sigma_1 \geq \sigma_2 \geq \ldots \geq \sigma_{k^2}$, U is an orthogonal matrix and V is an orthogonal matrix;
c) determining whether or not $\min_j |\sigma_j - \sigma_{j-1}| > \epsilon$, where $\epsilon$ shows a constant greater than or equal to machine epsilon;
d) if the result of the determination in the step c) is "No", returning to the step c) subsequent to performing singular value decomposition of enlarged matrix $T_\alpha$;
e) if the result of the determination in the step c) is "Yes", obtaining matrix $T_1 = U^T T$; and
f) obtaining matrix $T_1 = U^T T$ based on matrix $T_1$,
wherein the performing singular value decomposition of enlarged matrix $T_\alpha$ comprises the steps of:
creating enlarged matrix $T_\alpha$ based on matrix T and a frame added to at least a portion of at least one side of image matrix X, the frame having a size of at least k pixels and k pixels; and
obtaining the singular value decomposition of the enlarged matrix $T_\alpha$, $T_\alpha = USV^T$, where $S = \text{diag}(\sigma_1, \sigma_2, \ldots, \sigma_{k^2})$, $\sigma_1, \sigma_2, \ldots, \sigma_{k^2}$ is a singular value of $T_\alpha$ which satisfies $\sigma_1 \geq \sigma_2 \geq \ldots \geq \sigma_{k^2}$, U is an orthogonal matrix, and V is an orthogonal matrix.

3. An image feature extraction method according to claim 1, wherein the image is a gray scale image or a color image.

4. An image feature extraction method according to claim 2, wherein the image is a gray scale image or a color image.

5. An image feature extraction method according to claim 1, wherein the singular value decompositions of the T and the $T_\alpha$ are performed by floating point arithmetic.

6. An image feature extraction method according to claim 2, wherein the singular value decompositions of the T and the $T_\alpha$ are performed by floating point arithmetic.

7. An image feature extraction method according to claim 1, wherein the singular value decompositions of the T and the $T_\alpha$ are performed by integer arithmetic.

8. An image feature extraction method according to claim 2, wherein the singular value decompositions of the T and the $T_\alpha$ are performed by integer arithmetic.

9. An image feature extraction method according to claim 1, wherein a known $k^2$ dividing process is used together with the $k^2$ dividing process, so that the given image matrix X is converted into a multi-divided image.

10. An image feature extraction method according to claim 2, wherein a known $k^2$ dividing process is used together with the $k^2$ dividing process, so that the given image matrix X is converted into a multi-divided image.

11. An image compression method for compressing an image, comprising the steps of:
performing $k^2$ (k is an arbitrary integer greater than or equal to 2) dividing process at least once on a given image so as to convert the given image into a multi-divided image; and
performing a data compression process on the multi-divided image so as to create a compressed image,
wherein the $k^2$ dividing process comprises the steps of:
a) creating matrix T based on image matrix X;
b) computing singular values $\sigma_1, \sigma_2, \ldots, \sigma_{k^2}$ of the matrix T, where $\sigma_1 \geq \sigma_2 \geq \ldots \geq \sigma_{k^2}$;
c) determining whether or not $\min_j |\sigma_j - \sigma_{j-1}| > \epsilon$, where $\epsilon$ shows a constant greater than or equal to machine epsilon;
d) if the result of the determination in the step c) is "No", returning to the step c) subsequent to computing the singular values of the enlarged matrix $T_\alpha$;
e) if the result of the determination in the step c) is "Yes", obtaining U which satisfies $T = USV^T$, where $S = \text{diag}(\sigma_1, \sigma_2, \ldots, \sigma_{k^2})$, U is an orthogonal matrix and V is an orthogonal matrix;
f) obtaining matrix $T_1 = U^T T$; and
g) creating image matrix $X_1$ based on matrix $T_1$,
wherein the computing the singular values of the enlarged matrix $T_\alpha$ in the step d) comprises the steps of:
creating enlarged matrix $T_\alpha$ based on matrix T and a frame added to at least a portion of at least one side of image matrix X, the frame having a size of at least k pixels and k pixels; and
computing singular values $\sigma_1, \sigma_2, \ldots, \sigma_{k^2}$ of the enlarged matrix $T_\alpha$, where $\sigma_1 \geq \sigma_2 \geq \ldots \geq \sigma_{k^2}$.

12. An image compression method for compressing an image, comprising the steps of:
performing $k^2$ (k is an arbitrary integer greater than or equal to 2) dividing process at least once on a given image so as to convert the given image into a multi-divided image; and
performing a data compression process on the multi-divided image so as to create a compressed image,
wherein the $k^2$ dividing process comprises the steps of:
a) creating matrix T based on image matrix X;
b) obtaining a singular value decomposition of the matrix T, $T = USV^T$, where $S = \text{diag}(\sigma_1, \sigma_2, \ldots, \sigma_{k^2})$, $\sigma_1, \sigma_2, \ldots, \sigma_{k^2}$ are singular values of T satisfying $\sigma_1 \geq \sigma_2 \geq \ldots \geq \sigma_{k^2}$, U is an orthogonal matrix and V is an orthogonal matrix;
c) determining whether or not $\min_j |\sigma_j - \sigma_{j-1}| > \epsilon$, where $\epsilon$ shows a constant greater than or equal to machine epsilon;
d) if the result of the determination in the step c) is "No", returning to the step c) subsequent to performing singular value decomposition of enlarged matrix $T_\alpha$;
e) if the result of the determination in the step c) is "Yes", obtaining matrix $T_1 = U^T T$; and
f) obtaining matrix $T_1 = U^T T$ based on matrix $T_1$,
wherein the performing singular value decomposition of enlarged matrix $T_\alpha$ comprises the steps of:
creating enlarged matrix $T_\alpha$ based on matrix T and a frame added to at least a portion of at least one side of image matrix X, the frame having a size of at least k pixels and k pixels; and
obtaining the singular value decomposition of the enlarged matrix $T_\alpha$, $T_\alpha = USV^T$, where $S = \text{diag}(\sigma_1, \sigma_2, \ldots, \sigma_{k^2})$, $\sigma_1, \sigma_2, \ldots, \sigma_{k^2}$ is a singular value of $T_\alpha$ which satisfies $\sigma_1 \geq \sigma_2 \geq \ldots \geq \sigma_{k^2}$, U is an orthogonal matrix, and V is an orthogonal matrix.

13. An image compression method according to claim 11, wherein the image is a gray scale image or a color image.

14. An image compression method according to claim 12, wherein the image is a gray scale image or a color image.

15. An image compression method according to claim 11, wherein the singular value decompositions of the T and the $T_\alpha$ are performed by floating point arithmetic.

16. An image compression method according to claim 12, wherein the singular value decompositions of the T and the $T_\alpha$ are performed by floating point arithmetic.

17. An image compression method according to claim 11, wherein the singular value decomposition of the T and the $T_\alpha$ are performed by integer arithmetic.

18. An image compression method according to claim 12, wherein the singular value decomposition of the T and the $T_\alpha$ are performed by integer arithmetic.

19. An image compression method according to claim 11, wherein a known $k^2$ dividing process is used together with the $k^2$ dividing process, so that the given image matrix X is converted into a multi-divided image.

20. An image compression method according to claim 12, wherein a known $k^2$ dividing process is used together with the $k^2$ dividing process, so that the given image matrix X is converted into a multi-divided image.

* * * * *